(12) United States Patent
Shin et al.

(10) Patent No.: US 12,446,074 B2
(45) Date of Patent: Oct. 14, 2025

(54) METHOD AND DEVICE FOR TRANSMITTING/RECEIVING SIGNAL IN WIRELESS COMMUNICATION SYSTEM

(71) Applicant: LG ELECTRONICS INC., Seoul (KR)

(72) Inventors: Seokmin Shin, Seoul (KR); Haewook Park, Seoul (KR); Suckchel Yang, Seoul (KR); Seonwook Kim, Seoul (KR); Youngdae Lee, Seoul (KR); Kijun Kim, Seoul (KR); Joonkui Ahn, Seoul (KR); Jaehyung Kim, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 17/911,957

(22) PCT Filed: Mar. 31, 2021

(86) PCT No.: PCT/KR2021/003978
§ 371 (c)(1),
(2) Date: Sep. 15, 2022

(87) PCT Pub. No.: WO2021/201586
PCT Pub. Date: Oct. 7, 2021

(65) Prior Publication Data
US 2023/0180297 A1    Jun. 8, 2023

(30) Foreign Application Priority Data
Mar. 31, 2020    (KR) .......... 10-2020-0039340

(51) Int. Cl.
*H04W 74/0833*    (2024.01)
*H04W 74/08*    (2009.01)
*H04W 84/06*    (2009.01)

(52) U.S. Cl.
CPC ... *H04W 74/0833* (2013.01); *H04W 74/0891* (2013.01); *H04W 84/06* (2013.01)

(58) Field of Classification Search
CPC ......... H04W 74/0833; H04W 74/0891; H04W 84/06; H04W 56/0045; H04W 74/0836;
(Continued)

(56) References Cited

U.S. PATENT DOCUMENTS

2019/0268060 A1    8/2019    Nam et al.
2019/0306893 A1    10/2019    Ly et al.
(Continued)

FOREIGN PATENT DOCUMENTS

KR    1020200008062    1/2020
WO    2019-242537    12/2019

OTHER PUBLICATIONS

CATT et al., "TP on Random Access procedure," 3GPP TSG-RAN WG2 Meeting #108, R2-1916505, Nov. 2019, pp. 2-3, 5 pages.
(Continued)

*Primary Examiner* — Ricky Q Ngo
*Assistant Examiner* — Kabir U Jahangir
(74) *Attorney, Agent, or Firm* — LEE, HONG, DEGERMAN, KANG & WAIMEY

(57) ABSTRACT

A method and a device for transmitting/receiving a signal in a wireless communication system, according to one embodiment of the present invention, receive random access channel (RACH) configurations, and transmit a random access preamble on a specific RACH occasion (RO) on the basis of the RACH configurations. The number of reference points in a cell is derived on the basis of the number of RACH configurations, and each of the reference points can have a first timing advance (TA) value for an RACH process.

15 Claims, 14 Drawing Sheets

(58) Field of Classification Search
CPC ........... H04W 74/0838; H04W 52/146; H04W 52/48; H04W 52/50; H04W 74/006; H04W 52/36; H04W 56/0005; H04W 56/0015; H04W 72/0446; H04W 74/002; H04B 7/1851; H04B 7/18519

See application file for complete search history.

(56) References Cited

U.S. PATENT DOCUMENTS

| | | | | |
|---|---|---|---|---|
| 2019/0349077 | A1 | 11/2019 | Alasti et al. | |
| 2021/0112600 | A1* | 4/2021 | Lei | H04W 72/04 |
| 2021/0127429 | A1* | 4/2021 | Huang | H04W 74/0833 |
| 2021/0282179 | A1* | 9/2021 | Lei | H04W 74/002 |
| 2021/0378025 | A1* | 12/2021 | Lin | H04W 74/0833 |
| 2022/0217783 | A1* | 7/2022 | Liu | H04W 74/0833 |

OTHER PUBLICATIONS

CMCC, "Considerations on Timing Advance and RACH for Non-Terrestrial," 3GPP TSG-RAN WG1 #99, R1-1912536, Nov. 2019, pp. 2-5, 8 pages.

Ericsson, "TP on remaining details on Random access for NTN," 3GPP TSG-RAN WG2 #108, R2-1916414, Nov. 2019, pp. 2-3, 5 pages.

PCT International Application No. PCT/KR2021/003978, International Search Report dated Jul. 9, 2021, 3 pages.

European Patent Office Application Serial No. 21780052.3, Search Report dated Feb. 27, 2024, 10 pages.

Samsung, "Uplink timing advance/RACH procedure and Initial Access for NTN," R1-1912470, 3GPP TSG RAN WG1 Meeting #99, Nov. 2019, 12 pages.

Nokia et al., "Doppler Compensation, Uplink Timing Advance and Random Access in NTN," R1-1913017, 3GPP TSG RAN WG1 #99, Nov. 2019, 28 pages.

CATT, "PRACH design and UL timing management," R1-1912165, 3GPP TSG RAN WG1 Meeting #99, Nov. 2019, 5 pages.

Korean Intellectual Property Office Application No. 10-2022-7031966, Office Action dated Jul. 3, 2025, 6 pages.

ZTE Corporation et al., "Remaining issue on RACH for NTN," 3GPP TSG RAN WG2 Meeting #106, R2-1906114, May 2019, 6 pages.

\* cited by examiner

[FIG. 1]
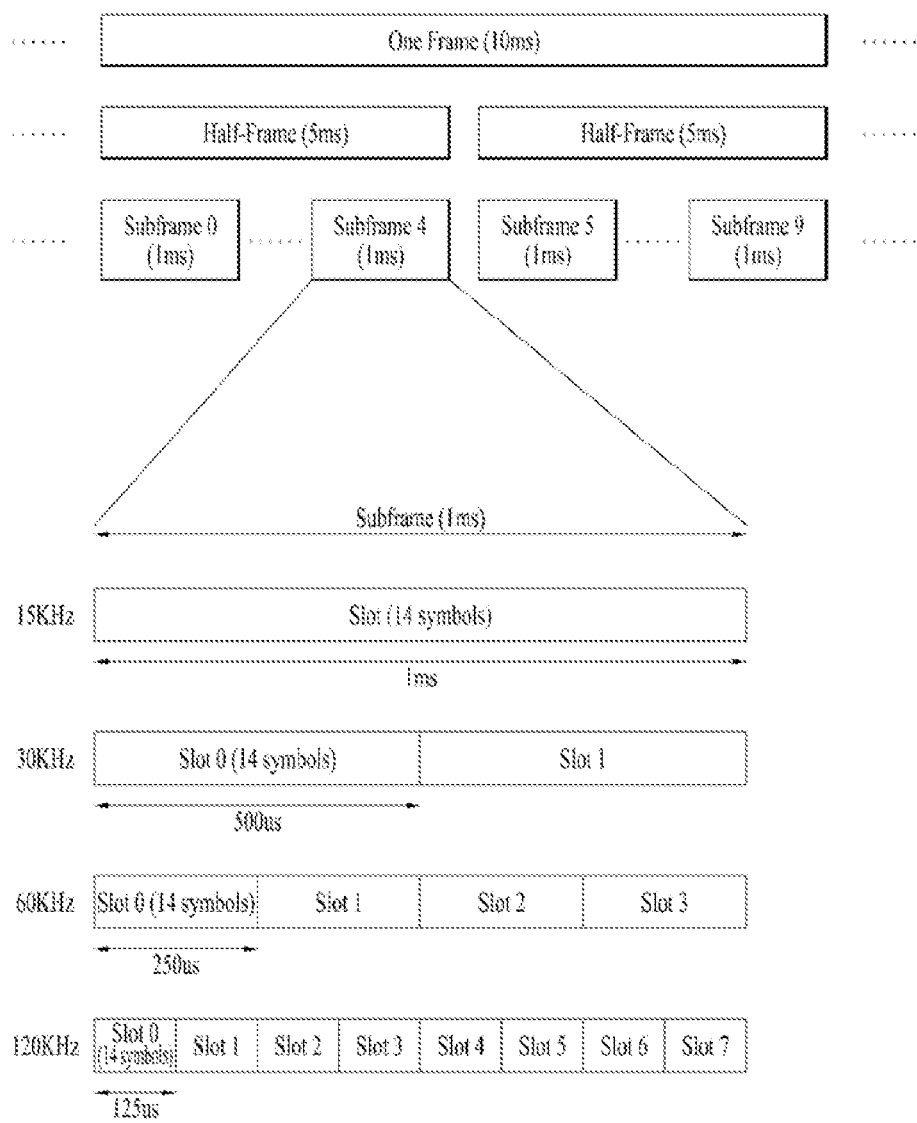

[FIG. 2]
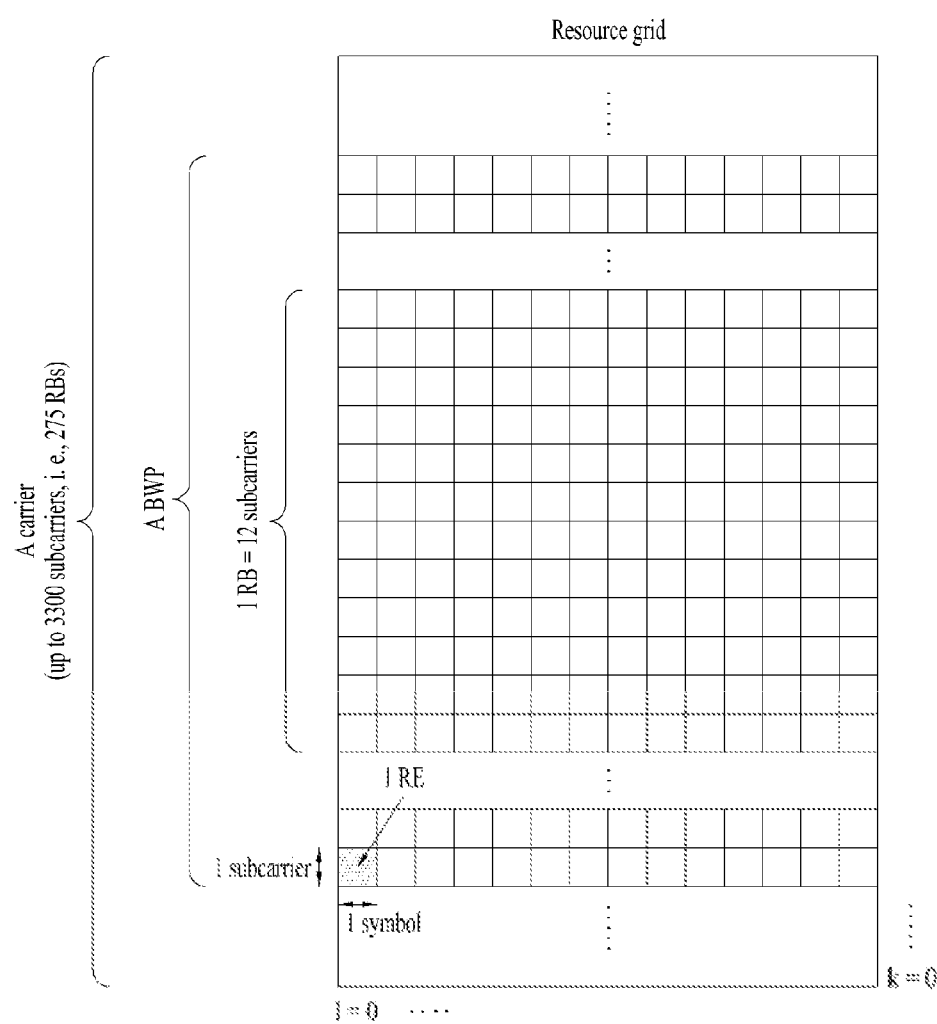

【FIG. 3】
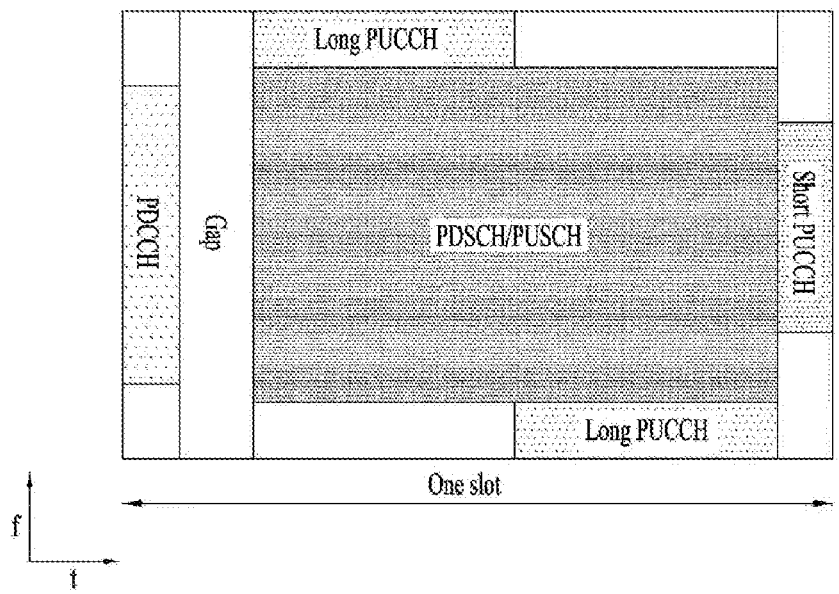
【FIG. 4】
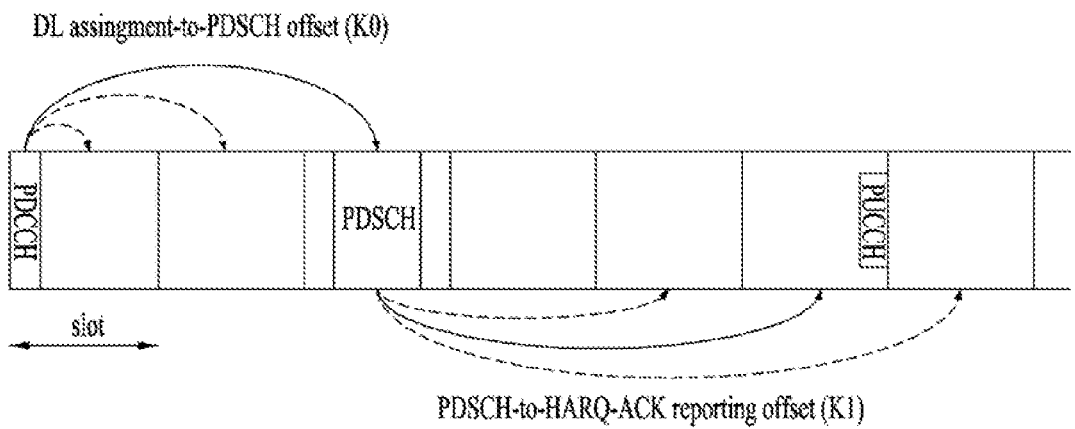

[FIG. 5]
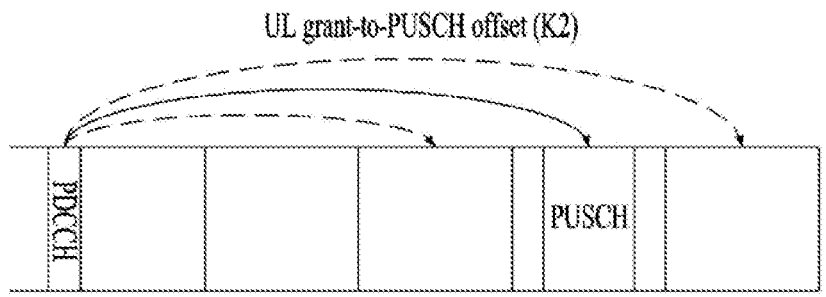

【FIG. 6】
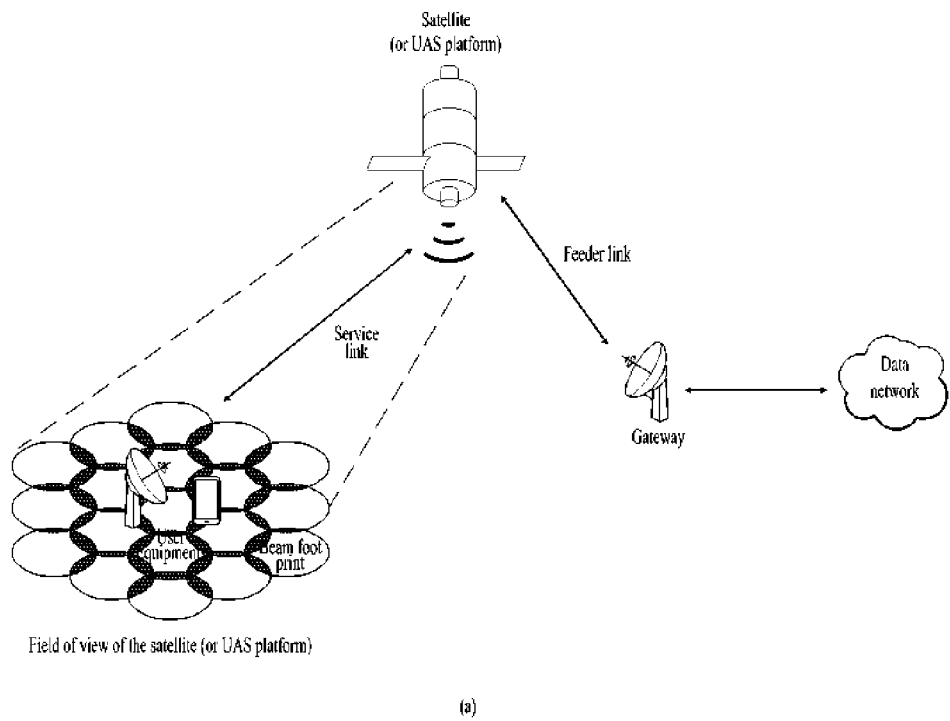
(a)
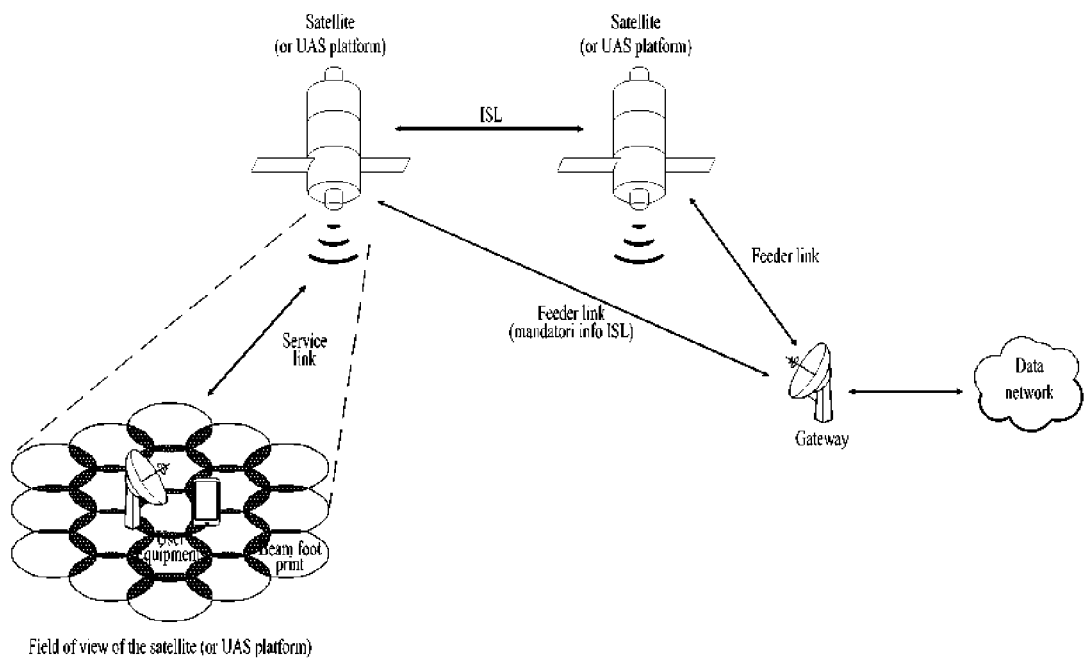

【FIG. 7】
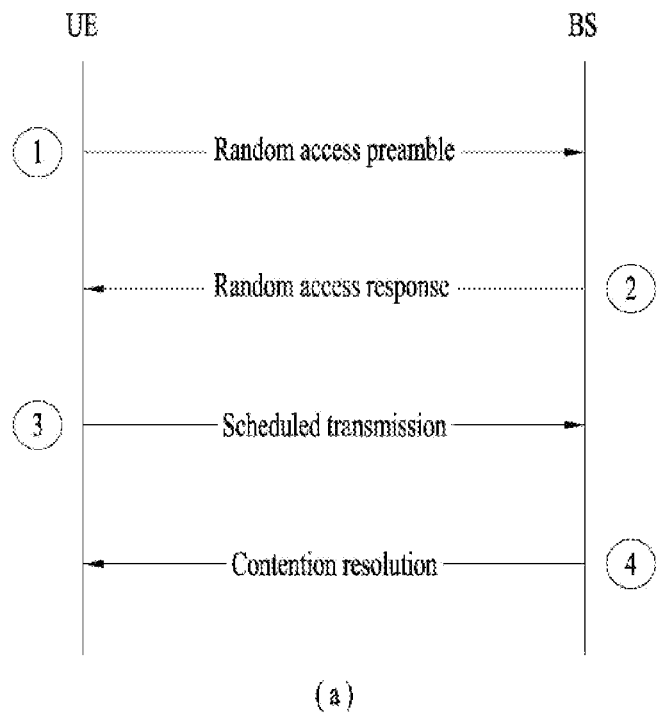
(a)
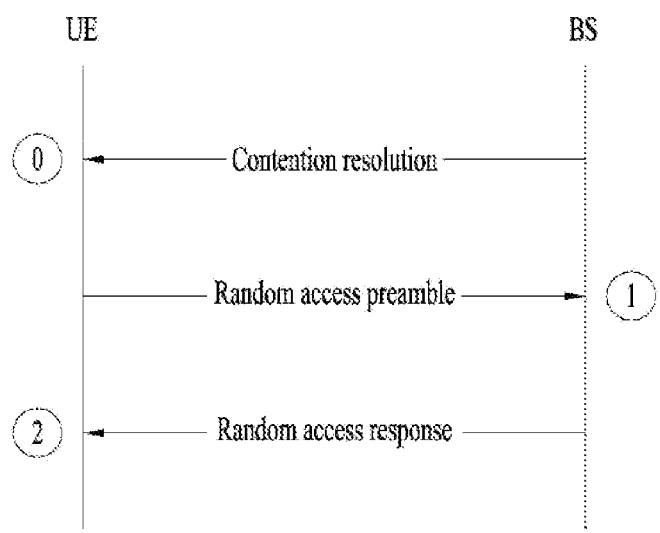
(b)

【FIG. 8】
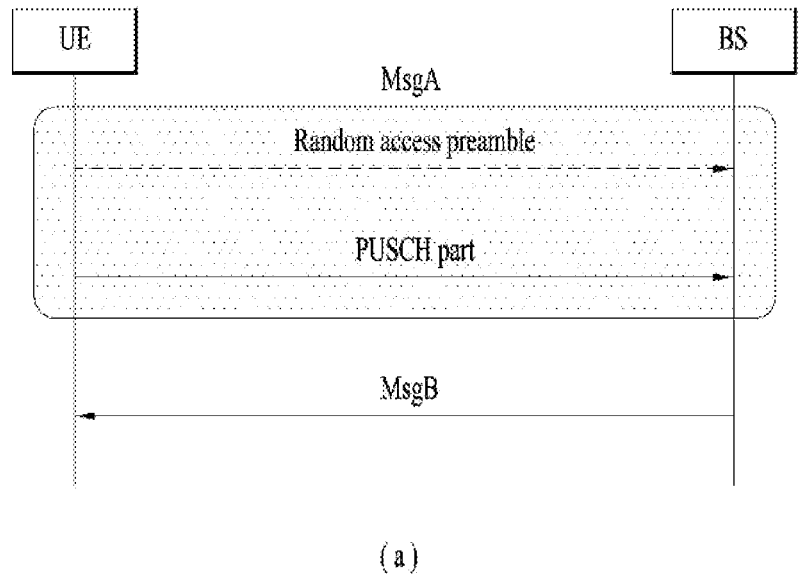
(a)
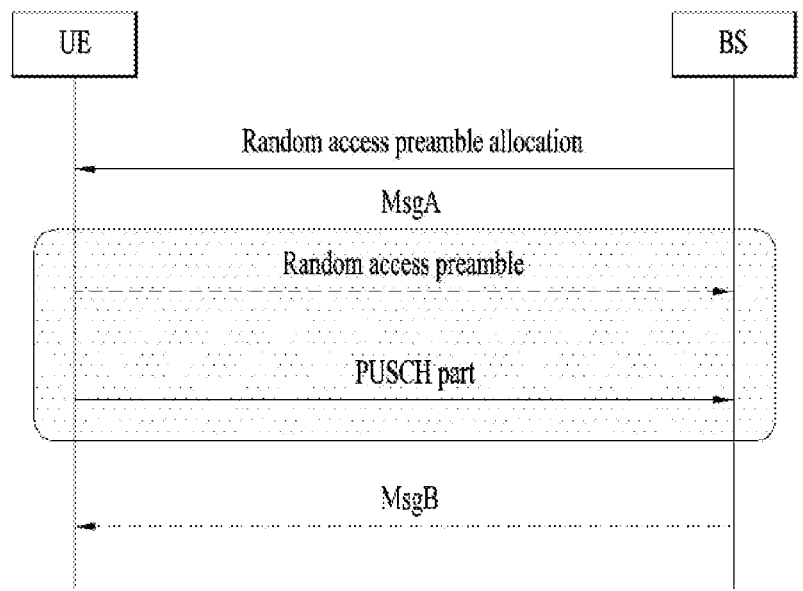
(b)

[FIG. 9]
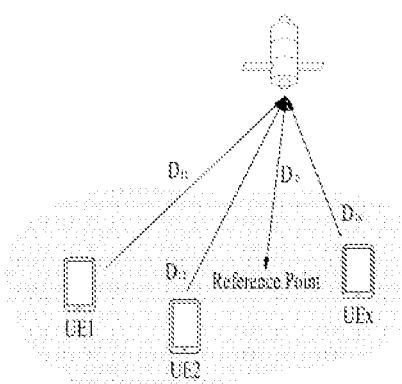
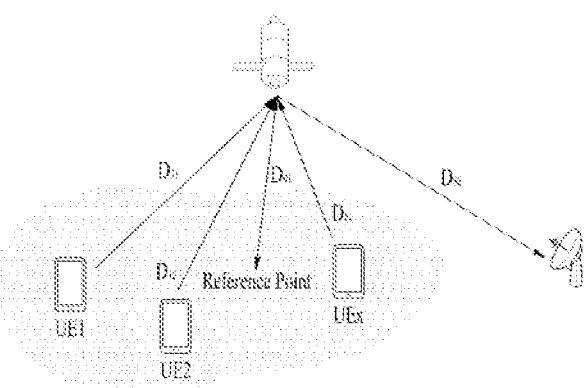
(a) Regenerative payload
(b) Transparent payload

[FIG. 10]
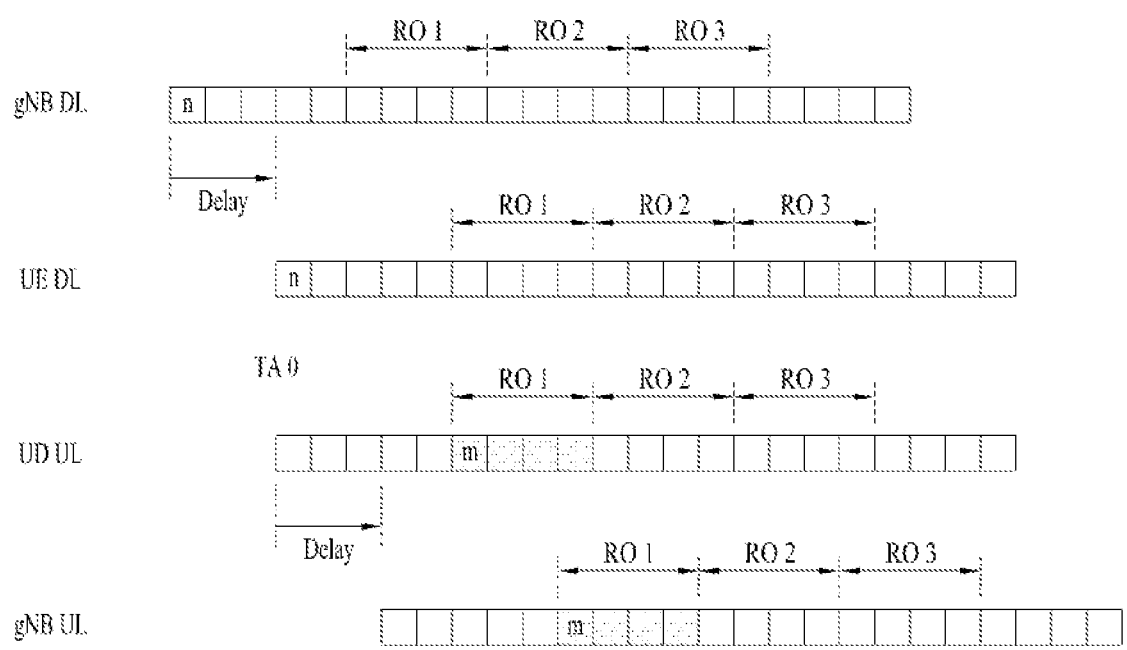

[FIG. 11]
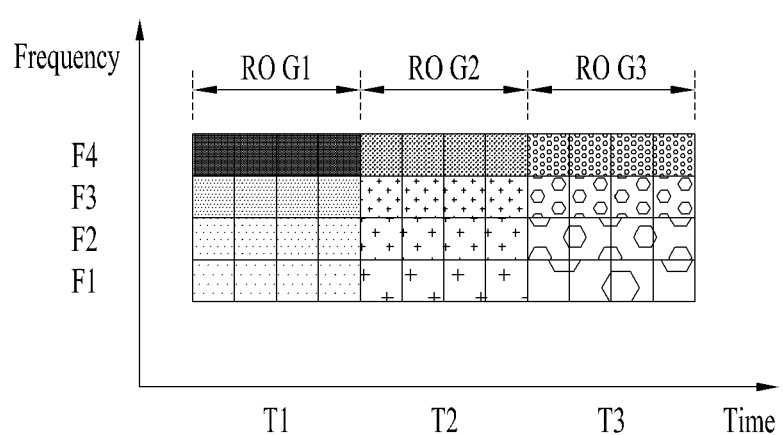

[FIG. 12]
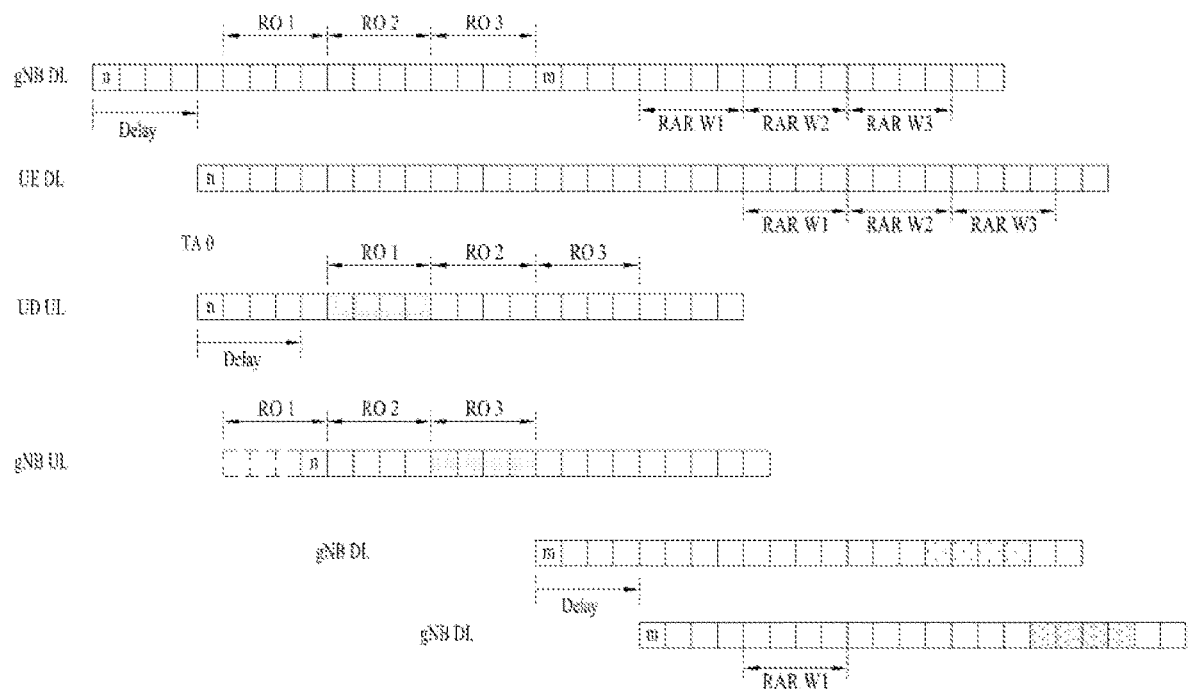

【FIG. 13】
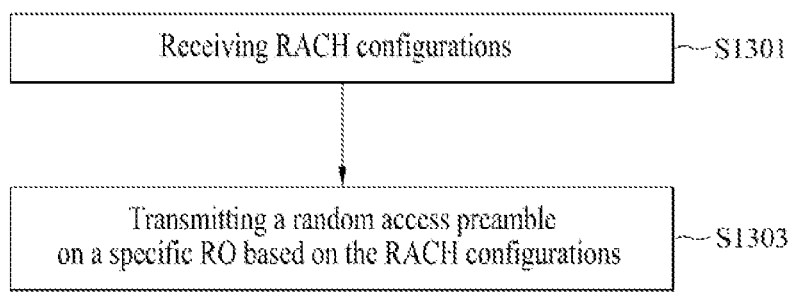
【FIG. 14】
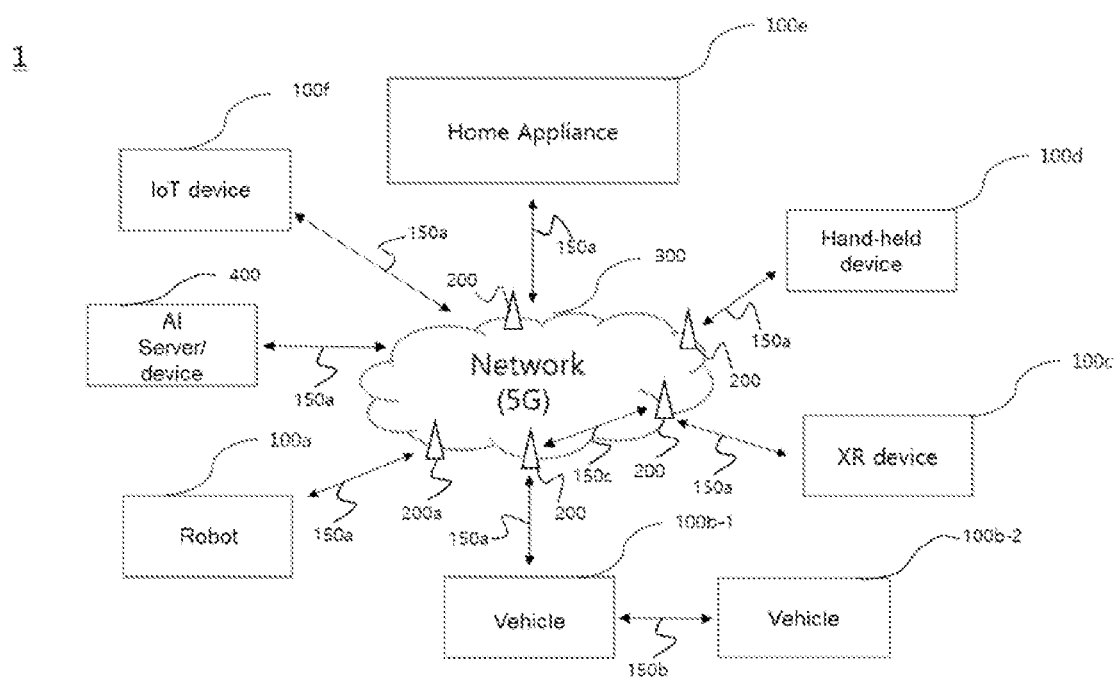

【FIG. 15】
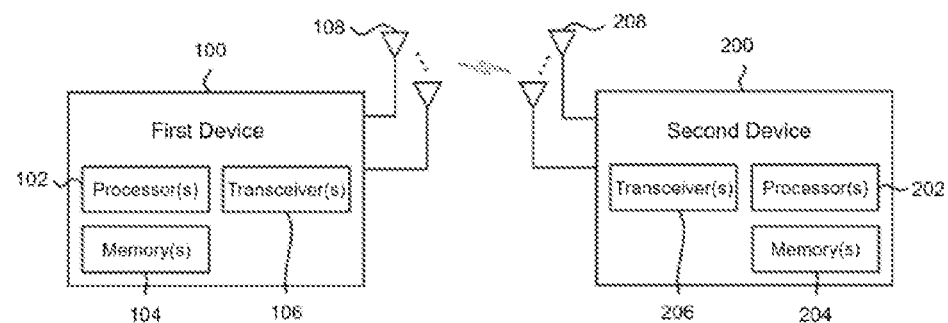
【FIG. 16】
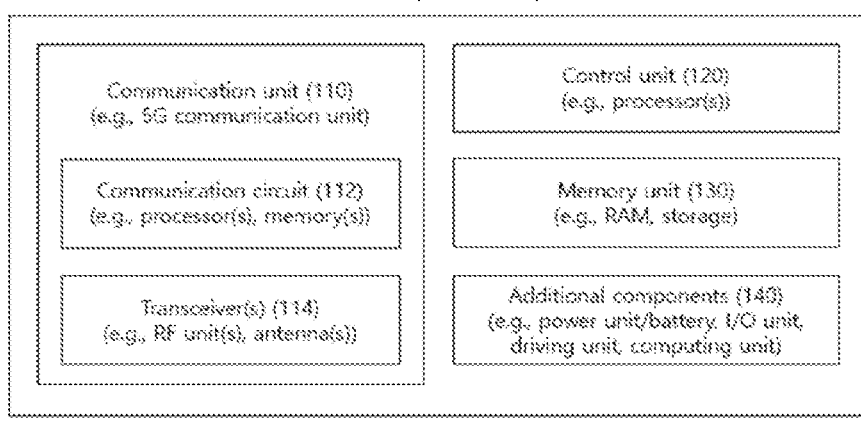

[FIG. 17]
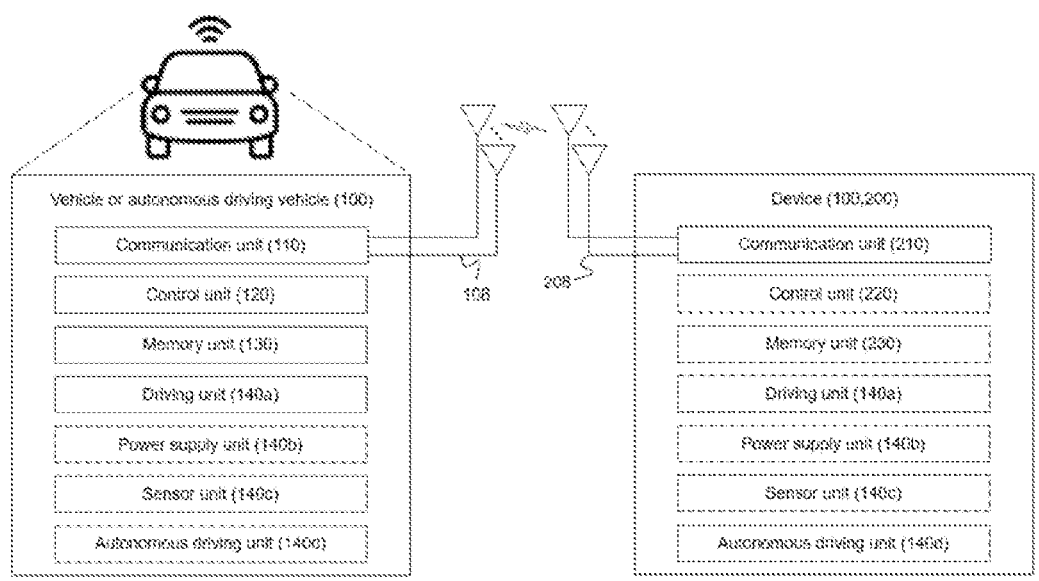

METHOD AND DEVICE FOR TRANSMITTING/RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2021/003978, filed on Mar. 31, 2021, which claims the benefit of earlier filing date and right of priority to Korean Application No. 10-2020-0039340, filed on Mar. 31, 2020, the contents of which are all incorporated by reference herein in their entirety.

TECHNICAL FIELD

The present disclosure relates to a method and apparatus for use in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

The object of the present disclosure is to provide a method and apparatus for performing a random access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

According to an aspect of the present disclosure, a method of transmitting and receiving a signal by a user equipment (UE) for supporting a Non-Terrestrial Network (NTN) in a wireless communication system includes receiving Random Access Channel (RACH) configurations, and transmitting a random access preamble on a specific RACH occasion (RO) based on the RACH configurations, wherein a number of reference points in a cell is derived based on a number of the RACH configurations, and wherein the reference points have each initial timing advance (TA) value for an RACH process.

According to another aspect of the present disclosure, a user equipment (UE) for transmitting and receiving a signal in a wireless communication system includes at least one transceiver, at least one processor, and at least one memory operatively connected to the at least one processor, and configured to store instructions for causing the at least one processor to perform a specific operation when being executed, wherein the specific operation includes receiving Random Access Channel (RACH) configurations, and transmitting a random access preamble on a specific RACH occasion (RO) based on the RACH configurations, wherein a number of reference points in a cell is derived based on a number of the RACH configurations, and wherein the reference points have each initial timing advance (TA) value for an RACH process.

According to another aspect of the present disclosure, an apparatus for a user equipment (UE) includes at least one processor, and at least one memory operatively connected to the at least one processor, and configured to cause the at least one processor to perform an operation when being executed, wherein the operation includes receiving Random Access Channel (RACH) configurations; and transmitting a random access preamble on a specific RACH occasion (RO) based on the RACH configurations, wherein a number of reference points in a cell is derived based on a number of the RACH configurations, and wherein the reference points have each initial timing advance (TA) value for an RACH process.

Another aspect of the present disclosure provides a computer-readable storage medium including at least one computer program for causing at least one processor to perform an operation, the operation including receiving Random Access Channel (RACH) configurations, and transmitting a random access preamble on a specific RACH occasion (RO) based on the RACH configurations, wherein a number of reference points in a cell is derived based on a number of the RACH configurations, and wherein the reference points have each initial timing advance (TA) value for an RACH process.

According to another aspect of the present disclosure, a method of transmitting and receiving a signal by a base station (BS) for supporting a Non-Terrestrial Network (NTN) in a wireless communication system includes transmitting Random Access Channel (RACH) configurations, and receiving a random access preamble on a specific RACH occasion (RO) based on the RACH configurations, wherein a number of the RACH configurations is determined based on a number of reference points in a cell, and wherein the reference points have each initial timing advance (TA) value for an RACH process.

According to another aspect of the present disclosure, a base station (BS) for transmitting and receiving a signal in a wireless communication system includes at least one transceiver, at least one processor, and at least one memory operatively connected to the at least one processor, and configured to store instructions for causing the at least one processor to perform a specific operation when being executed, wherein the specific operation includes receiving Random Access Channel (RACH) configurations, and transmitting a random access preamble on a specific RACH occasion (RO) based on the RACH configurations, wherein a number of the RACH configurations is determined based on a number of reference points in a cell, and wherein the reference points have each initial timing advance (TA) value for an RACH process.

In the methods and the apparatuses, each of the RACH configurations may be indicated by an RACH configuration index, and a number of the RACH configuration indexes may be equal to a number of the reference points.

In the methods and the apparatuses, one reference point may be selected among the reference points based on each initial TA value, and the random access preamble may be transmitted based on the selected one reference point.

In the methods and the apparatuses, ramping may be performed on transmission power of the random access preamble based on that reception of Random Access Response (RAR) corresponding to the random access preamble fails, and the random access preamble with the transmission power on which ramping is performed may be retransmitted, and the selected reference point may be maintained.

In the methods and the apparatuses, the selected reference point may be changed to another reference point based on that reception of Random Access Response (RAR) corresponding to the random access preamble fails, and the random access preamble may be retransmitted based on an initial TA value of the another reference point, and transmission power of the random access preamble is maintained.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication apparatus may perform a random access procedure more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates a radio frame structure.

FIG. 2 illustrates a resource grid during the duration of a slot.

FIG. 3 illustrates a self-contained slot structure.

FIG. 4 illustrates an acknowledgment/negative acknowledgment (ACK/NACK) transmission process.

FIG. 5 illustrates an exemplary PUSCH transmission process.

FIG. 6 shows an example of a wireless communication system for supporting an NTN.

FIGS. 7 and 8 show a random access process.

FIGS. 9 to 13 are diagrams for explaining an NTN system and a random access process according to an embodiment of the present disclosure.

FIGS. 14 to 17 show an example of apparatuses according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A plurality of RB interlaces (simply, interlaces) may be defined in the frequency domain. Interlace m E {0, 1, . . . , M-1} may be composed of (common) RBs {m, M+m, 2M+m, 3M+m, . . . }. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
|---|---|
| 0_0 | Scheduling of PUSCH in one cell |
| 0_1 | Scheduling of one or multiple PUSCH in once cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmission by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configued Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI | Group signaling |
| UE Specific | UE Specific | C-RNTI, MCS-C-RNTI or CS-RNTI | UE signaling (e.g., PDSCH/PUSCH) | etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.
  controlResourceSetId: this parameter/information indicates the identifier (ID) of the CORESET.
  frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.
  duration: this parameter/information indicates time-domain resources of the CORESET. The parameter/information duration may indicate the number of consecutive OFDMA symbols included in the CORESET. For example, duration has a value of 1-3.
  cce-REG-MappingType: this parameter/information indicates a CCE-to-REG mapping type. An interleaved type and a non-interleaved type may be supported.
  precoderGranularity: this parameter/information indicates a precoder granularity in the frequency domain.
  tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.
  tci-PresentInDCI: this parameter/information indicates whether a TCI field is included in DCI.
  pdcch-DMRS-ScramblingID: this parameter/information indicates information used for initialization of a PDCCH DMRS scrambling sequence.

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.
  searchSpaceId: this parameter/information indicates the ID of the SS set.
  controlResourceSetId: this parameter/information indicates the CORESET associated with the SS set.
  monitoringSlotPeriodicityAndOffset: this parameter/information indicates a PDCCH monitoring periodicity (in a unit of slot) and a PDCCH monitoring offset (in a unit of slot)
  monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.
  nrofCandidates: this parameter/information indicates the number of PDCCH candidates (e.g., one of 0, 1, 2, 3, 4, 5, 6, and 8) for each AL (where AL={1, 2, 4, 8, 16}).
  searchSpaceType: this parameter/information indicates whether the SS type is the CSS or USS.
  DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (HACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 7 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)
  Supportable UCI payload size: up to K bits (e.g., K=2)
  Number of OFDM symbols included in one PUCCH: 1 to X symbols (e.g., X=2)
  Transmission structure: only a UCI signal is configured with no DM-RS, and a UCI state is transmitted by selecting and transmitting one of a plurality of sequences.

(1) PUCCH Format 1 (PF1)
  Supportable UCI payload size: up to K bits (e.g., K=2)
  Number of OFDM symbols included in one PUCCH: Y to Z symbols (e.g., Y=4 and Z=14)
  Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)
  Supportable UCI payload size: more than K bits (e.g., K=2)
  Number of OFDM symbols included in one PUCCH: 1 to X symbols (e.g., X=2)
  Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)
  Supportable UCI payload size: more than K bits (e.g., K=2)
  Number of OFDM symbols included in one PUCCH: Y to Z symbols (e.g., Y=4 and Z=14)
  Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)
  Supportable UCI payload size: more than K bits (e.g., K=2)
  Number of OFDM symbols included in one PUCCH: Y to Z symbols (e.g., Y=4 and Z=14)
  Transmission structure: UCI and a DMRS are configured/mapped in/to different symbols based on TDM. The DFT is applied to encoded UCI bits with no multiplexing between UEs.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

FIG. 5 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

1. Wireless Communication System for Supporting Non-Terrestrial Network (NTN)

Non-Terrestrial Network (NTN) refers to a network or a network segment, which is configured to use a radio resource in a satellite or an Unmanned Aircraft System (UAS) platform.

In order to ensure a wider coverage or to provide a wireless communication service in a place in which it is not easy to install a wireless communication BS, use of a non-terrestrial network (NR NTN) or LTE NTN service has been considered. An NR or LTE service as an existing terrestrial network (TN) service provides a wireless communication service to UEs by installing a corresponding BS on the ground, but the NTN service provides a wireless communication service to UEs by installing a BS at places on the ground, where an artificial satellite (a geostationary earth orbit, a low-earth orbit, a medium-earth orbit, etc.), an airplanes, an unmanned plane, a drone, or the like is not positioned rather than installing the BS on the ground.

FIG. 6 shows examples of scenarios of NTN that a UE is capable of accessing. FIG. 6(*a*) shows an example of an NTN scenario based on a transparent payload, and FIG. 6(*b*) shows an example of an NTN scenario based on a regenerative payload.

The NTN may be usually characterized by the following factors.

One or more sat-gateways for connecting the NTN to a common data network:

A Geostationary Earth Orbiting (GEO) satellite may be provided from one or more sat-gateways disposed in a coverage (e.g., regional or even continental coverage) targeted by a satellite. UEs within a cell may be assumed to be served by only one sat-gateway;

A non-GEO satellite may be successively served by one or more gat-gateways. A system may ensure a service and feeder link continuity between serving sat-gateways for a time period sufficient to proceed with mobility anchoring and handover.

Feeder link or wireless link between sat-gateway and satellite (or UAS platform)

Service link or wireless link between UE and satellite (or UAS platform)

Satellite (or UAS platform) for implementing one of transparent or regenerative (including onboard processing) payload. Satellite (or UAS platform) may generally generate multiple beams in a service area with a boundary defined by a field of view of the satellite (or UAS platform). The footprint of the beam may be generally elliptical. The field of view of the satellite (or UAS platform) may be determined according to an onboard antenna diagram and the minimum elevation angle.

Transparent payload: Radio frequency filtering, and frequency conversion and amplification. Thus, a waveform signal repeated by a payload is not changed.

Regenerative payload: Demodulation/decoding, switching and/or routing, coding/modulation as well as radio frequency filtering and frequency conversion and amplification. This is practically equivalent to having all or some of functions of a BS (e.g., gNB) on a satellite (or UAS platform).

Inter-satellite links (ISL) in the case of a satellite group. To this end, the satellite requires a regeneration payload. The ISLs may operate at an RF frequency or a wide band.

A UE may be served by a satellite (or UAS platform) within a target service area.

Table 8 below shows an example of types of a satellite (or UAS platform).

TABLE 8

| Platforms | Altitude range | Orbit | Typical beam footprint size |
| --- | --- | --- | --- |
| Low-Earth Orbit (LEO) satellite | 300-1500 km | Circular around the earth | 100-1000 km |
| Medium-Earth Orbit (MEO) satellite | 7000-25000 km | | 100-1000 km |

TABLE 8-continued

| Platforms | Altitude range | Orbit | Typical beam footprint size |
|---|---|---|---|
| Geostationary Earth Orbit (GEO) satellite | 35 786 km | rotational station keeping position fixed in terms of elevation/azimuth with respect to a given earth point | 200-3500 km |
| UAS plarform (including HAPS) | 8-50 km (20 km for HAPS) | | 5-200 km |
| High Elliptical Orbit (HEO) satellite | 400-50000 km | Elliptical around the earth | 200-3500 km |

Generally,

The GEO satellite and the UAS may be used to provide a continental, regional, or local service.

A Low Earth Orbiting (LEO) and Medium Earth Orbiting (MEO) group may be used to provide a service in both the Northern and Southern Hemispheres. In some cases, constellation may also provide global coverage including a polar region. For later, an appropriate orbital inclination, sufficient generated beams, and inter-satellite links may be required.

A Highly Elliptical Orbiting (HEO) satellite system may also be considered.

Hereinafter, a wireless communication system in an NTN including the following six reference scenarios will be described.

Circuit orbit and nominal station keeping platform
Highest Round Trip Delay (RTD) constraint
Highest Doppler constraint Transparent or regenerative payload One case with ISL and one case without ISL. In the case of inter-satellite link, a regenerative payload may be required.

Fixed or steerable beams causing a moving or fixed footprint on the ground.

Six reference scenarios are considered in Tables 9 and 10.

TABLE 9

| | Transparent satellite | Regenerative satellite |
|---|---|---|
| GEO based non-terrestrial access network: | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 10

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e g. 2 GHz)<br>>6 GHz (e g. DL 20 GHz, UL 30 GHz) | |
| Max channel bandwidth capability (service link) | 30 MHz for band <6 GHz<br>1 GHz for band >6 GHz | |
| Payload | Scenario A : Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes/No (Both cases are possible.) |
| Earth-fixed beams | Yes | Scenario C1: Yes (steerable beams), see note 1<br>Scenario C2: No (the beams move with the satellite)<br>Scenario D 1: Yes (steerable beams), see note 1<br>Scenario D 2: No (the beams move with the satellite) |
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude)<br>3,131 km (1,200 km altitude) |

TABLE 10-continued

| Scenarios | GEO based non-terrestrial access network (Scenario A and B) | LEO based non-terrestrial access network (Scenario C & D) |
|---|---|---|
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km) 21 ppm(1200 km) |
| Max Doppler shift variation (earth fixed user equipment) | 0.000 045 ppm/s | 0.27 ppm/s (600 km) 0.13 ppm/s(1200 km) |
| User equipment motion on the earth | 1200 km/h (e.g. aircraft) | 500 km/h (e.g. high speed train) Possibly 1200 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 20 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

Reference 1: Each satellite may steer a beam to a fixed point on the Earth by using beamforming technology. This may be applied for a time corresponding to visibility of the satellite.

Reference 2: The max delay variation in the beam (UE fixed on the ground) may be calculated based on the minimum elevation angle (Min Elevation angle) for both the gateway and the UE.

Reference 3: The maximum differential delay in the beam may be calculated based on a diameter of the maximum beam footprint at the lowest point (at nadir).

Reference 4: The speed of light used to calculate the delay may be 299,792,458 m/s.

Reference 5: The size of the maximum beam footprint of the GEO may be determined based on GEO High Throughput system technology of the current state under the assumption that there is a spot beam at a coverage edge (low altitude).

Reference 6: The maximum differential delay at a cell level may be calculated in consideration at a beam level delay for the largest beam size. When the size of the beam is small or medium, the cell may include two or more beams. However, the cumulative differential delay of all beams in the cell may not exceed the maximum differential delay at a cell level in Table 10.

The NTN-related description of the present specification may be applied to an NTN GEO scenario and any non-geostationary orbit (NGSO) scenario having a circuit orbit with an altitude equal to or greater than 600 km.

2. Random Access Procedure

FIG. 7 illustrates random access procedures. FIG. 7(a) illustrates the contention-based random access procedure, and FIG. 7(b) illustrates the dedicated random access procedure.

Referring to FIG. 7(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 7(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.
Step 1: The UE transmits the RACH preamble on a PRACH.
Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.

RA preamble index: 6 bits
UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.
SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.
PRACH mask index: 4 bits. When the bits of the RA preamble index are all non-zeroes, the PRACH mask index indicates an RACH occasion associated with the SSB indicated by the SSB index. Otherwise, it is reserved.
Reserved: 10 bits When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ_feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 11

| Component | Description | Time (ms) |
| --- | --- | --- |
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C- RNIT assignment + L1 encoding of RRC Connection Request | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

As illustrated in FIG. 8(a), the 2-step random access procedure may include two steps: transmission of a UL signal (referred to as MsgA) from the UE to the BS and transmission of a DL signal (referred to as MsgB) from the BS to the UE.

The following description focuses on the initial access procedure, but the proposed methods may be equally applied to the random access procedure after the UE and BS establish an RRC connection. Further, a random access preamble and a PUSCH part may be transmitted together in a non-contention random access procedure as shown in FIG. 8(b).

While not shown, the BS may transmit a PDCCH for scheduling Msg. B to the UE, which may be referred to as a Msg. B PDCCH.

3. Reference Point Configuration in NTN

The above-described contents (NR frame structure, NTN system, etc.) may be applied in combination with methods proposed in the present specification to be described below, or may be supplemented to clarify the technical features of the methods proposed in the present specification.

Methods related to the configuration of a plurality of reference points to be described below are related to uplink transmission and may be equally applied to a downlink signal transmission method in the NR system or LTE system described above, and needless to say, the technological spirit proposed in the present specification may be modified or replaced according to the term, expression, structure, etc. defined in each system to be implemented in the corresponding system.

FIG. 9 shows an example in which a reference point is implemented in an NTN.

A frequency band considered for an NR NTN service may be mainly a band of 2 GHz for a band equal to or less than 6 GHz and a band of DL 20 GHz and UL 30 GHz for a band equal to or greater than 6 GHz. For each scenario, the cell coverage may be changed from as small as 1000 km to as large as 3500 km. As such, when the cell coverage is widened, the BS needs to configure a large maximum timing advance (TA) value for uplink transmission to provide a service to all UEs in the corresponding cell. However, as the maximum TA value increases, a problem occurs in that a resource overhead of a container indicating a TA command increases due to the RACH process or DCI format.

Accordingly, in order to overcome the problem, a plurality of reference points in one cell may be defined. In this case, the reference point may be a point used as a reference when a UE configures TA for UL transmission. The BS may solve the problem of increasing the resource overhead of the container indicating a TA command by introducing a plurality of reference points.

The present specification proposes a method of configuring a plurality of reference points, a method of selecting a reference point of a UE, and an RACH process configuring method based on a plurality of reference points.

3.1. Method of Configuring Multiple Reference Points by BS

The following methods may be considered as a method for the BS to configure a plurality of reference points and to inform the UE.

[Method 3-1-1: Method of Distinguishing Multiple Reference Points Using Independent RACH Configuration (e.g., RACH Occasion)]

The BS may independently configure/instruct the RACH configuration (e.g., RACH occasion) for each of the cell-specific multiple reference points through higher-layer signaling (e.g., SIB1) to the UE. At least one RACH configuration needs to be transmitted. Characteristically, the total number of the independently configured/indicated RACH configurations may indicate the total number of reference points provided by a corresponding cell. A specific example is as follows.

Example 3-1-1-1) Each RACH configuration may be independently indicated for each RACH configuration index, and a value of the RACH configuration index may be configured to 0 to a Max RACH configuration number−1.

In this case, the Max RACH configuration number may be a value that is preconfigured in a system. As described above, since at least one RACH configuration needs to be transmitted, an RACH configuration index 0 needs to always be indicated.

The BS may select one of values from 0 to a Max RACH configuration number−1 and may indicate an RACH configuration of the selected value.

When only one RACH configuration (i.e., RACH configuration index 0) is transmitted, devices in a corresponding cell may be operated based on a single reference point.

Example 3-1-1-2) A parameter (e.g., msg1-FrequencyStart) indicating a start PRB (within UL BWP) in which a PRACH preamble is transmitted for each reference point may be differently configured, and RACH occasions corresponding to the respective parameters may be FDMed.

A start PRB may be indicated based on a subcarrier spacing (SCS) of a corresponding UL BWP, and thus the BS may FDM ROs for each reference point in consideration of an SCS value of a corresponding UL BWP, an SCS value of a PRACH preamble, a length of a PRACH sequence, and the like.

Taking a specific number as an example, the start PRB of the reference point n+1 may be configured to be greater than X+12 in consideration of the case in which a reference point n+1 is FDMed after a reference point n assuming that the SCS of the corresponding UL BWP is 30 kHz, the start PRB of the reference point n is X, and the L-839 ZC (Zadoff Chu) sequence is configured to use SCS of 5 kHz at the reference point n. In this case, 12 PRBs may correspond to a PRB number, which is the smallest integer to be configured to 30 kHz SCS (a SCS value of a corresponding UL BWP) while having a greater bandwidth than 839*5=4195 kHz (i.e., a bandwidth occupied by a PRACH preamble).

Taking another specific number as an example, the start PRB of the reference point n+1 may be configured to be greater than X+24 in consideration of the case in which a reference point n+1 is FDMed after a reference point n assuming that the SCS of the corresponding UL BWP is 15 kHz, the start PRB of the reference point n is X, and the L-139 ZC sequence is configured to use SCS of 30 kHz at the reference point n. In this case, 24 PRBs may correspond to a PRB number, which is the smallest integer to be configured to 15 kHz SCS (a SCS value of a corresponding UL BWP) while having a greater bandwidth than 39*30=4170 kHz (i.e., a bandwidth occupied by a PRACH preamble).

The BS may transmit additional information for each reference point as well as RACH configurations that are independently transmitted. The BS may provide such additional information to a UE in order to help the UE to select an appropriate reference point among a plurality of reference points using a corresponding value.

Position information (e.g., coordinates (latitude, longitude), altitude etc.) of each reference point may be provided via higher-layer signaling.

An initial TA value (e.g., common TA) to be used to transmit a PRACH preamble in an RO corresponding to each reference point may be provided via higher-layer signaling. The BS may configure a corresponding initial TA value for each reference point and may finely adjust the remaining TA through an existing RAR TA command field.

A reference signal received power (RSRP) range, an angle of arrival (AOA) range, or the like may be configured for each reference point.

In addition, when an RACH configuration is independently indicated for each reference point, time and/or frequency resources of each RO may be configured not to overlap. When time and/or frequency resources corresponding to respective ROs for a plurality of reference points overlap entirely or partially, the UE may determine that reference points corresponding to overlapping ROs and related information are invalid. Characteristically, an RO according to an RACH configuration indicated to be initial (e.g., RACH configuration index 0) among RACH configurations indicated by the BS. When a time and/or frequency resource of a corresponding default RO entirely or partially overlaps a time and/or frequency resource corresponding to another RO, the UE may determine that only a reference point corresponding to a default RO among overlapping reference points and related information are valid.

When an RACH configuration is independently indicated for each reference point, ROs may be configured to prevent time and/or frequency resources between the ROs from overlapping. In order to effectively manage an RACH response (RAR) window for each reference point, or the like, each RO may be configured via TDM instead of FDM. In order to configure each RO via TDM, the BS may configure RO configurations for respective reference points to prevent a RACH slot between RO configurations from overlapping. The BS may configure a period, a starting offset value, and the like to prevent an RACH slot from overlapping by differently configuring the period, the starting offset value, and the like for the respective ROs.

[Method 3-1-2: Method of Successively Arranging ROs Assigned to a Plurality of Reference Points on Time Axis when BS Configures Plurality of Reference Points]

A second method may be a method of successively arranging ROs assigned to a plurality of reference points on the time axis when the plurality of reference points are configured. In this case, ROs on the frequency domain may be included in the same frequency band. Characteristically, in this method, the BS may provide an initial TA value (common TA) configured for each reference point to the UE, but may not separately inform RO information mapped to each reference point, and may be used when only entire RO information is provided.

The BS may arrange ROs corresponding to the plurality of reference points in the form of TDM, may map a reference point having a large TA value to an RO located at a position earlier in time, and may map a reference point having a small TA value to an RO located at a position late in time. This may be to ensure that RACH transmission of any UE present in a corresponding cell does not deviate from a PRACH preamble reception window (i.e., RO) of the BS.

FIG. 10 shows an example in which ROs corresponding to a plurality of reference points are arranged in the form of TDM. It may be assumed that one RO occupies 4 OFDM symbols and that RO1 to RO3 are arranged in the form of TDM. It may be assumed that delay of a UE is 3 OFDM symbols (round trip delay 6 OFDM symbol). When the UE transmits a PRACH preamble using RO1 as a target, the PRACH preamble may be divided into 2 OFDM symbols for each of RO2 and RO3 and may be received from a BS reception point of view. As will be further described in UE operation in Section 3.2, when the BS receives the PRACH preamble as shown in FIG. 10, a RACH process of the UE may fail. However, there may be an advantage that the corresponding PRACH preamble does not damage a UL signal/channel of other UEs.

A detailed example to which Method 3-1-2 is applied may be shown in FIG. 11. Referring to FIG. 11, the number of a plurality of reference points may be three, four ROs may be FDMed for each reference point, the four FDMed ROs may be included in one RO group, and a plurality of RO groups may be successively arranged on the time axis. Four ROs positioned in the same time axis may be mapped one-to-one to one reference point.

Alternatively, a plurality of TDMed ROs on the time axis may be grouped, and the grouped ROs may be mapped to one reference point. For example, ROs located on the same frequency axis may be mapped to one reference point.

[Method 3-1-3: Method of Configuring SSBs (or a SSB Group) to be Assigned to Different Reference Points]

A third method may be a method of configuring SSBs (or a SSB group including a plurality of SSBs) to be assigned to different reference points. The BS may indicate an RACH configuration using one of the following methods.

Opt 3-1-3-1) A single RACH configuration for only a SSB group to which a corresponding SSB belongs may be transmitted through a higher-layer signaling (e.g., SIB1) corresponding to each SSB. According to the present option, a higher-layer signaling overhead for a RACH configuration may be maintained at an existing level.

Opt 3-1-3-2) A plurality of RACH configurations (i.e., independent RACH configuration for each SSB group) for all SSB groups may be transmitted through higher-layer signaling (e.g., SIB1) corresponding to each SSB. According to the present option, there may be an advantage that the UE does not need to perform SIB1 decoding again when changing a reference point for PRACH retransmission.

According to the above options, in order to for the UE to perform SSB-to-RO mapping according to an RACH configuration given for each SSB group, the BS may need to inform the UE which SSB indexes belong to each SSB group.

Characteristically, in Method 3-1-3, a common TA value (e.g., z) corresponding to a specific reference point may be mapped to a specific SSB (e.g., SSB index x) and an RO (e.g., RO index y) corresponding thereto, and a common TA value (e.g., z') corresponding to another reference point may be mapped to another SSB (e.g., SSB index x') and an RO (e.g., RO index y') corresponding thereto. The BS may need to provide a sharp beam in order to use this method. When a beam is not a sharp beam, resource waste of a DL region reserved for SSB transmission and subsequent channel transmission related thereto may occur.

When independent RACH configurations are indicated for respective SSB groups, a cell ID may be set differently for each SSB group than before. For example, an existing cell ID may be configured, and a sub cell ID may be configured as a sub-concept of the existing cell ID. In addition, a plurality of additionally assigned cell ID values may be assigned to respective SSB groups separately from the existing cell ID value. In terms of a UE, a plurality of SSB groups may be present in one SSB group per cell ID. In the state in which the UE recognizes one cell based on a cell ID corresponding to one SSB group, the UE may select an SSB index and may perform an RACH process in the same method as in the existing NR system.

When an RO group is TDMed and configured for each reference point as shown in FIG. 3-1A of Method 2, a plurality of ROs belonging to the RO group may be mapped for respective different SSB indexes or SSB groups. That is, this method may be used when an SSB or an SSB group is mapped to each reference point after different ROs are assigned for respective reference points.

The RACH configuration may be maintained without change (i.e., the same RACH configuration is given to all SSBs (or SSB group)), mapping of SSBs (or SSB group) to ROs may be configured to one-to-one mapping for each SSB (or SSB group), and different reference points may be assigned for the respective SSBs (or SSB group). That is, the BS may indicate reference points (and/or common TA values) for respective SSBs or SSB groups through higher-layer signaling.

As a detailed example, it may be assumed that the number of SSB indexes is 2, only one RO is present for each RACH slot, and an RACH slot is present in every slot. When SSB-to-RO mapping is configured to one-to-one mapping, SSB index 0 may be mapped to an RO of an even (RACH) slot, and SSB index 1 may be mapped to an RO of an odd (RACH) slot. In this situation, when different reference points (and/or initial common TA) are configured for respective SSB indexes, ROs assigned to different reference points may be TDMed.

In another example, it may be assumed that the number of SSB indexes is six, an SSB group index corresponding to SSB indexes grouped by three is two, three ROs for each RACH slot are FDMed (and/or TDMed) and are present, and an RACH slot is present in every slot. When SSB-to-RO mapping is configured to one-to-one mapping, SSB group index 0 may be mapped to an RO of an even (RACH) slot, and SSB group index 1 may be mapped to an RO of an odd (RACH) slot. In addition, three SSB indices belonging to SSB group index 0 may be mapped one-to-one to different ROs. Three SSB indices belonging to SSB group index 1 may be mapped one-to-one to different ROs. In this situation, when different reference points (and/or initial common TAs) are configured for respective SSB group indexes, ROs assigned to different reference points may be TDMed. Different ROs assigned to the same reference point may be FDMed.

3.2 Method of Selecting Appropriate Reference Point Among Plurality of Reference Points by UE A method of selecting an appropriate reference point from among a plurality of reference points by the UE may be divided according to a method of configuring a reference point by the BS (the methods described in Section 3.1).

[Method 3-2-1: Method of Selecting Appropriate Reference Point of UE when Independent RACH Configurations are Configured for Respective Reference Points]

First, when the BS uses a method of providing independent RACH configurations for respective reference points as in Method 3-1-1 of Section 3.1, an operation of the UE may be summarized as follows. According to the reference point selection method of the UE to be described below, the UE may sequentially list appropriate reference points, which may be regarded as a method of determining priorities among a plurality of reference points.

Method 3-2-1-A: This may be a method in which the UE compares physical position information for each reference point and preferentially selects the reference point closest to the current UE position. Method 3-2-1-A may be used by the UE that does not know an accurate position of the BS. The UE may preferentially select the nearest reference point using a position of the UE and the position of the reference point. The UE may select an RO corresponding to the selected reference point according to Method 3-2-1-A, and may transmit a PRACH preamble using a preconfigured initial TA value.

Method 3-2-1-B: This may be a method in which the UE calculates an appropriate TA value using position information of the UE and the BS and then selects the most appropriate reference point first according to the initial TA value for each reference point configured by the UE. The method may be used by the UE that is capable of accurately know the position of the BS and the position of the UE itself. The UE may be configured to calculate an appropriate TA value (reference TA value) and then to preferentially select a reference point that is smaller than the corresponding TA value and provides the largest initial TA.

For example, when the BS indicates initial TA values of three reference points with a, b, and c (where a<b<c), if a reference TA value calculated using position information of the UE and the BS is x (the BS may make a value of a as small as possible and a value of x is larger than a).

(1) If a<x<b<c, the UE may select a reference point with an initial TA value of a.
(2) If a<b<x<c, the UE may select a reference point with an initial TA value of b.
(3) If a<b<c<x, the UE may select a reference point with an initial TA value of c.

The UE may select an RO corresponding to the reference point selected according to Method 3-2-1-B and may transmit a PRACH preamble using a preconfigured initial TA value for a corresponding reference point.

Method 3-2-1-C: This may be a method in which the BS preferentially selects a reference point assigned to a position corresponding to an RSRP of the UE based on a preconfigured RSRP ranged for reference point selection. This may be used by the UE when the UE does not know an accurate position of the UE. The BS may indicate an RSRP threshold in order to divide an RSRP range for reference point selection. When the number of the indicated RSRP thresholds is X, the number of all RSRP ranges may be X+1, and when the RSRP thresholds are listed in small order (or in large order), the RSRP thresholds may be expressed to RSRP range #X from RSRP range #0. The UE may select an RO corresponding to the reference point selected according to Method 3-2-1-C and may transmit a PRACH preamble using a preconfigured initial TA value for a corresponding reference point.

Method 3-2-1-D: This may be a method in which the BS preferentially selects a reference point assigned to an AOA of the UE based on a preconfigured AOA range for reference point selection. The BS may indicate an AOA threshold in order to divide an AOA for reference point selection. When the number of indicated AOA thresholds is Y, the number of all AOA ranges is Y+1, and when the AOA thresholds are listed in small order (or in large order), the AOA thresholds may be expressed to AOA range #Y from AOA range #0. The UE may select an RO corresponding to the reference point selected according to Method 3-2-1-D and may transmit a PRACH preamble using a preconfigured initial TA value for the corresponding reference point.

Method 3-2-1-E: This may be a method in which the UE selects a reference point in according to the RACH configuration index order (or reverse order) configured by the BS via higher-layer signaling. Basically, the priority of the reference point may be configured according to the order indicated by the BS. Characteristically, the BS may align the order of the reference point index by establishing a specific reference in order to support an operation of the UE. In this case, a parameter to be a specific reference may be a distance from a cell center and/or an initially configured TA value for each reference point.

[Method 3-2-2: Method of Selecting Appropriate Reference Point of UE when ROs for Plurality of Reference Points are Successively Arranged on Time Axis]

When ROs for a plurality of reference points are successively arranged on the time axis like in Method 3-1-2 of Section 3.1 above, the UE may select a reference point as follows.

Opt 3-2-2-1) This may be a method in which the UE selects a reference point with the smallest initial TA value, and transmits a PRACH preamble in the first RO among successively arranged ROs on the time axis, provided from the BS. When an initial TA value of a reference point selected by the UE is smaller than a round trip delay value of an actual UE, a PRACH preamble is transmitted on the first RO, and thus since the PRACH preamble is transmitted somewhere among the ROs successively arranged on the time axis after the first RO, UL signal/channel transmission of other UEs may not be interrupted. The UE may select a reference point having the next smallest initial TA value. As a time interval between an actual round trip delay value of the UE and the initial TA value of the initially selected reference point is increased, an RACH process may be disadvantageously lengthy.

Opt 3-2-2-2) This may be a method in which the UE selects a reference point with the largest initial TA value, and transmits a PRACH preamble in the last RO among ROs successively arranged on the time axis, provided from the BS. When an initial TA value of the reference point selected by the UE is greater than a round trip delay value of the actual UE, a PRACH preamble may be transmitted on the last RO, and thus since the PRACH preamble is transmitted somewhere among the ROs successively arranged on the time axis before the last RO, UL signal/channel transmission of other UEs may not be interrupted. The UE may select a reference point having the next greatest reference point. As a time interval between an actual round trip delay value of the UE and the initial TA value of the initially selected reference point is increased, an RACH process may be disadvantageously lengthy.

In Method 3-2-2, when RAR transmitted by the BS is detected and a Msg. 3 scheduling configuration is transmitted in an RAR window corresponding to an RO in which the UE transmits a PRACH preamble, the UE may determine that the Msg. 1 PRACH preamble is successfully transmitted and may transmit the Msg. 3 PUSCH.

For example, as shown in FIG. 12, when the UE transmits a PRACH preamble using RO1 as a target, the UE needs to monitor an RAR window corresponding thereto. However, in terms of the BS, when a corresponding PRACH preamble is received in another RO (e.g., RO3) but not RO1, the BS may transmit RAR in another RAR window (RAR window 3) but not RAR window 1. Thus, in this case, the UE may determine that RAR reception fails and may retransmit the Msg. 1 PRACH preamble.

In addition, as in Method 3-1-1, when the BS provides additional information for each reference point, the operation of the UE in Method 3-2-1 may also be used in Method 3-2-2.

[Method 3-2-3: Method of Selecting Appropriate Reference Point when Respective SSBs (or SSB Group) are Configured to be Assigned to Different Reference Points]

Third, as in Method 3-1-3 above, when respective SSBs (or a SSB group including a plurality of SSBs) are configured to be assigned to different reference points, the UE may select a reference point as follows.

The UE may select the most visible SSB index (e.g., the largest RSRP value) among the SSB indexes transmitted by the BS and may select the reference point mapped to the corresponding SSB index or the SSB group to which the corresponding SSB index belongs.

Then, the UE may know the initial TA value through the RACH configuration for the reference point and may also know the assigned RO information, and thus may transmit the PRACH preamble accordingly.

3.3. RACH Process Configuration Method of UE Based on Plurality of Reference Points When the BS provides a plurality of reference points, a plurality of reference points may also be appropriately used using the following method in a RACH process to be performed by the UE.

[Method 3-3-1: Method of Configuring Reference Point to be Used According to Specific RACH Process Among Plurality of Reference Points]

Reference points to be used for respective specific RACH processes among a plurality of reference points may be differently configured. For example, a specific reference point (e.g., default reference point) may be used in an initial access RACH process among a plurality of reference points, and one of a plurality of reference points may be selected and used by the UE in other RACH process (e.g., PDCCH ordered RACH process) except for initial access.

As proposed in Second 3.2 above, the UE may determine the priority through a method of selecting an appropriate reference point from among a plurality of reference points. Alternatively, for a specific RACH process, the BS may indicate a reference point to be used by the UE in other RACH processes except for initial access through perform higher-layer signalling (e.g., UE specific RRC signalling), Msg. 2 RAR (or PDCCH scheduling Msg. 2 PDCCH) and/or Msg. 4 PDSCH (or PDCCH scheduling Msg. 4 PDSCH).

In a PDCCH ordered RACH process, the BS may indicate a reference point to be used by the UE among a plurality of reference points, through a DCI field (e.g., DCI format 1-0).

The BS may transmit a reference point index in order to indicate a reference point. Alternatively, the BS may also indirectly indicate a reference point by indicating an initial TA value assigned to each reference point or an assigned RO.

[Method 3-3-2: Method of Determining Priority Among Plurality of Reference Points and Performing RACH Process while Changing Reference Point According to Specific Rule During RACH Process]

Hereinafter, a method of determining priority among a plurality of reference points and performing a RACH process while changing a reference point according to a predefined rule during a RACH process may be considered. For example, the UE may transmit a PRACH preamble using a reference point with the highest priority after determining a priority for each reference point, and then when RAR reception fails, the UE may transmit a PRACH preamble using a reference point with the next highest priority. Method 3-3-2 may be applied when the UE needs to perform an RACH process using a trial and error method because a plurality of ROs is configured to the UE through an RACH configuration of the BS but mapping information between a plurality of reference points and ROs is not configured to the UE. In this case, when RACH configurations (i.e., RO configuration) are independently indicated for respective reference points, if a reference point is changed, this may mean that a PRACH preamble is transmitted on an RO that complies with a different RACH configuration than before.

As an example of changing a reference point, a method in which the UE changes the reference point while maintain transmission power of Msg. 1 PRACH preamble may be considered. This method may have an advantage in that RAR is capable of being rapidly received when there is no problem in TX power. When an initial TA value assigned to a reference point selected by the UE is largely different from a round trip delay value of the current UE, the UE may rapidly change the selected reference point to another reference point.

In another example of a method of changing a reference point, the UE may maintain a reference point and may first perform ramping on transmission power of a Msg. 1 PRACH preamble. In this case, when an initial TA value assigned to a reference point selected by the UE is not significantly different from a round trip delay value of the current UE, the RAR may be rapidly received. In a situation in which the UE does not receive RAR due to low transmission TX power, TX power ramping may be advantageously performed first.

[Method 3-3-3: Method of Differently Configuring PRACH Preamble Transmission Power Depending on Cases when One Reference Point or Plurality of Reference Points are Assigned to Respective SSB Indexes (or SSB Groups)]

When one reference point or a plurality of reference points are assigned to respective SSB indexes (or SSB groups), PRACH preamble transmission power may be different configured. That is, when the BS defines reference points for respective SSB indexes or SSB groups, the UE may perform an operation of changing an SSB index and/or a reference point during a RACH process.

Opt 3-3-3-1) When the UE changes only an SSB index in order to transmit a PRACH preamble during a RACH process and may maintain the reference point without change, the UE may transmit the PRACH preamble while maintaining previous PRACH preamble transmission power. Since only the SSB index is changed and the common TA and RO configurations are not changed, the transmission power may be maintained.

Opt 3-3-3-2) When the UE changes a reference point as well as an SSB index in order to transmit a PRACH preamble during a RACH process, the UE may change PRACH preamble transmission power to initial transmission power and may transmit a PRACH preamble. Common TA and RO configurations may be changed while a reference point is changed, and thus transmission power may be configured to initial transmission power.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal). The higher layer may include, for example, one or more of functional layers such as MAC, RLC, PDCP, RRC, or SDAP.

Methods, embodiments, or descriptions for implementing the method proposed in the present specification may be separately applied or one or more methods (embodiments, or descriptions) may be combined and applied.

IMPLEMENTATION EXAMPLES

FIG. 13 is a flowchart of a signal transmission/reception method according to embodiments of the present disclosure.

Referring to FIG. 13, embodiments of the present disclosure may be performed by a UE, and may include receiving RACH configurations (S1301), and transmitting a random access preamble on a specific RO based on the RACH configurations (S1303).

When a BS indicates a plurality of reference points using Method 3-1-1, the number of reference points in a cell may be derived based on the number of RACH configurations. The reference points may have each initial TA value for an RACH process. Each of the RACH configurations may be indicated by an RACH configuration index. The number of RACH configuration indexes may be the same as the number of reference points.

The BS may also indicate a plurality of reference points using different methods among the methods of Section 3.1.

When the UE selects one of a plurality of reference points using Method 3-2-1, the UE may select one of reference points based on each initial TA value. The UE may transmit a random access preamble based on a TA value of one selected reference point. In detail, the UE may determine a reference TA value and may select a reference point having the greatest TA value among reference points having a smaller TA value than the determined reference TA value.

The UE may also select one of a plurality of reference points using different methods among the methods of Section 3.2.

The UE may change the selected reference point during an RACH process using Method 3-3-2.

In detail, ramping may be performed on transmission power of a random access preamble based on that reception of Random Access Response (RAR) corresponding to the random access preamble fails, the random access preamble with transmission power on which ramping is performed, and the selected reference point may be maintained.

Alternatively, the selected reference point may be changed to another reference point based on that reception of Random Access Response (RAR) corresponding to a random access preamble fails, the random access preamble may be retransmitted based on the initial TA value of another reference point, and power transmission of the random access preamble may be maintained.

In addition to the operation described with reference to FIG. 13, one or more of the operations described with reference to FIGS. 1 to 12 and/or one or more of the operations described in Sections 3.1 to 3.3 may be combined and may be additionally performed.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 15 illustrates wireless devices applicable to the present disclosure.

Referring to FIG. 15, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied FIG. 16 illustrates another example of a wireless device applied to the present disclosure. The wireless device may be implemented in various forms according to a use case/service (refer to FIG. 14).

Referring to FIG. 16, wireless devices 100 and 200 may correspond to the wireless devices 100 and 200 of FIG. 15 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcasting terminal, a hologram device, a public safety device, an MTC device, a medical device, a FinTech device (or a finance device), a security device, a climate/environment device, the AI server/device (400 of FIG. 14), the BSs (200 of FIG. 14), a network node, or the like. The wireless device may be mobile or fixed according to a use case/service.

In FIG. 16, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof Example of Vehicle or Autonomous Driving Vehicle to which the Present Disclosure is Applied FIG. 17 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on.

The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

As described above, the present disclosure is applicable to various wireless communication systems.

The invention claimed is:

1. A method of transmitting and receiving a signal by a user equipment (UE) for supporting a Non-Terrestrial Network (NTN) in a wireless communication system, the method comprising:
receiving Random Access Channel (RACH) configurations; and transmitting a random access preamble on a specific RACH occasion (RO) based on the RACH configurations, wherein a number of reference points in a cell is derived based on a number of the RACH configurations, and wherein each of the reference points is a point at a specific distance away from a satellite and each of the reference points is used for determining a timing advance (TA) value for an RACH process.

2. The method of claim 1, wherein each of the RACH configurations is indicated by an RACH configuration index, and wherein a number of the RACH configuration indexes is equal to a number of the reference points.

3. The method of claim 1, wherein one reference point is selected among the reference points based on each TA value, and wherein the random access preamble is transmitted based on the selected one reference point.

4. The method of claim 3, wherein ramping is performed on transmission power of the random access preamble based on that reception of Random Access Response (RAR) corresponding to the random access preamble fails, and wherein the random access preamble with the transmission power on which ramping is performed is retransmitted, and the selected reference point is maintained.

5. The method of claim 3, wherein the selected reference point is changed to another reference point based on that reception of Random Access Response (RAR) corresponding to the random access preamble fails, and wherein the random access preamble is retransmitted based on a TA value of the other reference point, and transmission power of the random access preamble is maintained.

6. A user equipment (UE) for transmitting and receiving a signal in a wireless communication system, the UE comprising:

at least one transceiver;

at least one processor; and at least one memory operatively connected to the at least one processor, and configured to store instructions for causing the at least one processor to perform operations when being executed, wherein the operations include:

receiving Random Access Channel (RACH) configurations; and transmitting a random access preamble on a specific RACH occasion (RO) based on the RACH configurations, wherein a number of reference points in a cell is derived based on a number of the RACH configurations, and wherein each of the reference points is a point at a specific distance away from a satellite and each of the reference points is used for determining a timing advance (TA) value for an RACH process.

7. The UE of claim 6, wherein each of the RACH configurations is indicated by an RACH configuration index, and wherein a number of the RACH configuration indexes is equal to a number of the reference points.

8. The UE of claim 6, wherein one reference point is selected among the reference points based on each TA value, and wherein the random access preamble is transmitted based on the selected one reference point.

9. The UE of claim 8, wherein ramping is performed on transmission power of the random access preamble based on that reception of Random Access Response (RAR) corresponding to the random access preamble fails, and wherein the random access preamble with the transmission power on which ramping is performed is retransmitted, and the selected reference point is maintained.

10. The UE of claim 8, wherein the selected reference point is changed to another reference point based on that reception of Random Access Response (RAR) corresponding to the random access preamble fails, and wherein the random access preamble is retransmitted based on a TA value of the other reference point, and transmission power of the random access preamble is maintained.

11. An apparatus for a user equipment (UE), the apparatus comprising:

at least one processor, and at least one memory operatively connected to the at least one processor, and configured to cause the at least one processor to perform operations when being executed, wherein the operations include:

receiving Random Access Channel (RACH) configurations; and transmitting a random access preamble on a specific RACH occasion (RO) based on the RACH configurations, wherein a number of reference points in a cell is derived based on a number of the RACH configurations, and wherein each of the reference points is a point at a specific distance away from a satellite and each of the reference points is used for determining a timing advance (TA) value for an RACH process.

12. The apparatus of claim 11, wherein each of the RACH configurations is indicated by an RACH configuration index, and wherein a number of the RACH configuration indexes is equal to a number of the reference points.

13. The apparatus of claim 11, wherein one reference point is selected among the reference points based on each TA value, and wherein the random access preamble is transmitted based on the selected one reference point.

14. The apparatus of claim 13, wherein ramping is performed on transmission power of the random access preamble based on that reception of Random Access Response (RAR) corresponding to the random access preamble fails, and wherein the random access preamble with the transmission power on which ramping is performed is retransmitted, and the selected reference point is maintained.

15. The apparatus of claim 13, wherein the selected reference point is changed to another reference point based on that reception of Random Access Response (RAR) corresponding to the random access preamble fails, and wherein the random access preamble is retransmitted based on a TA value of the other reference point, and transmission power of the random access preamble is maintained.

* * * * *